United States Patent
Nakos et al.

(10) Patent No.: US 8,519,023 B2
(45) Date of Patent: Aug. 27, 2013

(54) FAST, CURING TWO PART ANAEROBIC ADHESIVE COMPOSITION

(75) Inventors: Steven T. Nakos, Andover, CT (US); Andrew D. Messana, Newington, CT (US); Anthony F. Jacobine, Meriden, CT (US); John G. Woods, Farmington, CT (US)

(73) Assignee: Henkel Corporation, Rocky Hill, CT (US)

( * ) Notice: Subject to any disclaimer, the term of this patent is extended or adjusted under 35 U.S.C. 154(b) by 15 days.

(21) Appl. No.: 13/187,299

(22) Filed: Jul. 20, 2011

(65) Prior Publication Data

US 2011/0272095 A1 Nov. 10, 2011

Related U.S. Application Data

(63) Continuation of application No. PCT/US2010/021458, filed on Jan. 20, 2010.

(60) Provisional application No. 61/146,081, filed on Jan. 21, 2009.

(51) Int. Cl.
*C09J 4/00* (2006.01)

(52) U.S. Cl.
USPC ............................................. 523/176; 524/83

(58) Field of Classification Search
USPC .......................................... 523/176; 524/83
See application file for complete search history.

(56) References Cited

U.S. PATENT DOCUMENTS

| 3,591,438 | A | 7/1971 | Toback et al. |
| 3,855,040 | A | 12/1974 | Malofsky |
| 4,287,330 | A | 9/1981 | Rich |
| 4,321,349 | A | 3/1982 | Rich |
| 4,322,509 | A | 3/1982 | Zalucha |
| 4,525,232 | A | 6/1985 | Rooney et al. |
| 5,512,608 | A | 4/1996 | Bachmann et al. |
| 5,605,999 | A | 2/1997 | Chu et al. |
| 5,811,473 | A | 9/1998 | Ramos et al. |
| 6,391,993 | B1 | 5/2002 | Attarwala et al. |
| 6,835,762 | B1 | 12/2004 | Klemarczyk et al. |
| 6,897,277 | B1 | 5/2005 | Klemarczyk et al. |
| 6,958,368 | B1 | 10/2005 | Klemarczyk et al. |
| 2003/0032736 | A1 | 2/2003 | Kneafsey et al. |
| 2008/0242764 | A1 | 10/2008 | Wallace et al. |
| 2008/0251195 | A1 | 10/2008 | Malofsky et al. |

FOREIGN PATENT DOCUMENTS

FR 1581361 9/1969

OTHER PUBLICATIONS

International Search Report for International Application No. PCT/US2010/021458 mailed on Sep. 16, 2010.
R.D. Rich, "Anaerobic Adhesives" in *Handbook of Adhesive Technology*, 29, 467-79, A. Pizzi and K.L. Mittal, eds., Marcel Dekker, Inc., New York (1994).

*Primary Examiner* — Edward Cain
(74) *Attorney, Agent, or Firm* — Steven C. Bauman

(57) ABSTRACT

The present invention concerns improved polymerizable anaerobic compositions which contain (meth)acrylic ester monomers, peroxy polymerization initiators, saccharin a saccharin derivative or a related sulfimide derivative and an activator containing a ferrocene moiety.

8 Claims, No Drawings

US 8,519,023 B2

FAST, CURING TWO PART ANAEROBIC ADHESIVE COMPOSITION

BACKGROUND OF THE INVENTION

1. Field of the Invention

The present invention relates to a novel anaerobic adhesive composition which cures rapidly that can be useful for curable compositions, such as adhesives and sealants.

2. Brief Description of Related Technology

Anaerobic adhesive compositions generally are well-known. See e.g. R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Often, such anaerobic adhesive compositions also contain accelerator components to increase the speed with which the composition cures.

Ferrocene-based anaerobics are known to liberate active iron under acidic conditions. This promotes cure on low-activity surfaces. Malofsky in U.S. Pat. No. 3,855,040 described a novel anaerobic formulation capable of curing on surfaces with low activity toward anaerobic cure, activated by strong acids such a methanesulfonic acid. The strong acid primer liberates active iron from the ferrocene which will react with the cumene hyperoxide, liberating free radicals suitable for polymerization of the acrylic monomers. The use if such acids can be undesirable because of their nature.

Non-ferrocene activated systems are also well known. For example, certain LOCTITE-brand anaerobic adhesive products available from Henkel Corporation use either saccharin alone or both saccharin and acetyl phenylhydrazine (APH) in various anaerobic adhesives.

U.S. Pat. No. 6,835,762 (Klemarczyk) provides an anaerobic curable composition based on a (meth)acrylate component with an anaerobic cure-inducing composition substantially free of acetyl phenylhydrazine and maleic acid and an anaerobic cure accelerator compound having the linkage —C(=O)—NH—NH— and an organic acid group on the same molecule, provided the anaerobic cure accelerator compound excludes 1-(2-carboxyacryloyl)-2-phenylhydrazine.

U.S. Pat. No. 6,897,277 (Klemarczyk) provides an anaerobic curable composition based on a (meth)acrylate component with an anaerobic cure-inducing composition substantially free of saccharin.

U.S. Pat. No. 6,958,368 (Messana) provides an anaerobic curable composition. This composition is based on a (meth)acrylate component with an anaerobic cure-inducing composition substantially free of saccharin.

Notwithstanding the state of the art, there is an on-going desire to find alternative technologies for anaerobic compositions to differentiate existing products and provide supply assurances in the event of shortages or cessation of supply of raw materials. Moreover, since certain of the raw materials used in anaerobic cure inducing compositions have to one degree or another come under regulatory scrutiny, alternative components would be desirable. There is a need to avoid using such compounds in view of the corrosivity and handling problems involved. Accordingly, it would be desirable to identify new materials that function in anaerobically curable compositions.

SUMMARY OF THE INVENTION

In some non-limiting embodiments, the present invention provides polymerizable anaerobic compositions comprising: a) at least one polymerizable acrylate ester monomer; b) at least one polymerization initiator capable of polymerizing said monomer in the absence of oxygen; c) at least one activator comprising a ferrocene moiety; and d) saccharin or a saccharin derivative.

In some non-limiting embodiments, the present invention provides two-part polymerizable compositions comprising: a) a first part comprising a mixture of: 1) at least one polymerizable acrylate ester monomer; 2) at least one hydroperoxy polymerization initiator capable of polymerizing said monomer in the substantial absence of oxygen; and 3) saccharin or a saccharin derivative; and b) a second part comprising an activator comprising a ferrocene moiety.

In some non-limiting embodiments, the present invention provides methods for sealing or bonding at least two substrates comprising: a) applying to at least one of said substrates a primer composition comprising an activator comprising a ferrocene moiety; b) applying to at least one of said substrates at least one polymerizable composition comprising a polymerizable acrylate ester monomer, at least one peroxy polymerization initiator capable of polymerizing said monomer in the substantial absence of oxygen and saccharin or a saccharin derivative; and c) placing said substrates in an abutting relationship until the polymerizable composition has hardened sufficiently to bond said surfaces.

DETAILED DESCRIPTION OF THE INVENTION

Other than in the operating examples, or where otherwise indicated, all numbers expressing quantities of ingredients, thermal conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

As used herein, the term "composition" is intended to encompass a product comprising the specified ingredients in the specified amounts, as well as any product which results, directly or indirectly, from combination of the specified ingredients in the specified amounts.

As used herein, the term "polymer" in meant to encompass oligomers, and includes without limitation both homopolymers and copolymers. The term "prepolymer" means a compound, monomer or oligomer used to prepare a crosslinked polymer having a three-dimensional network structure, and includes without limitation both homopolymer and copolymer oligomers. The term "oligomer" means a polymer consisting of only a few monomer units up to about ten monomer units, for example a dimer, trimer or tetramer.

As used herein, the term "cure" as used in connection with a composition, e.g., "composition when cured" or a "cured composition", means that any curable or crosslinkable components of the composition are at least partially cured or crosslinked. In some non-limiting embodiments of the present invention, the chemical conversion of the crosslinkable components, i.e., the degree of crosslinking, ranges from about 5% to about 100% of complete crosslinking where complete crosslinking means full reaction of all crosslinkable components. In other non-limiting embodiments, the degree of crosslinking ranges from about 15% to about 80% or about 50% to about 60% of full crosslinking. One skilled in the art will understand that the presence and degree of crosslinking, i.e., the crosslink density, can be determined by a variety of methods, such as dynamic mechanical thermal analysis (DMA) using a TA Instruments DMA 2980 DMA analyzer over a temperature range of −65° F. (−18° C.) to 350° F. (177° C.) conducted under nitrogen according to ASTM D 4065-01. This method determines the glass transition temperature and crosslink density of free films of coatings or polymers. These physical properties of a cured material are related to the structure of the crosslinked network.

As used herein, the term "effective amount" is meant an amount or concentration of the activator, depending upon the reactivity of the particular activator used, sufficient to effect an improvement in cure speed and/or cure-through-gap performance of the polymerizable composition as compared with the unactivated composition. Comparative cure speed or cure-through-gap performance can be determined in many different ways including (a) the evolution of mechanical properties, such as modulus tensile strength or hardness, as a function of time, by for example oscillating rheometry, stress-strain measurements or indentation tests; (b) the development of adhesive strength to specific substrates as a function of time, by for example lap-shear testing of bonded metal or plastic panels or break torque analysis of adhesively bonded threaded assemblies (c) a continuous or periodic spectroscopic analysis during the curing process that determines the rate of monomer consumption or crosslinked polymer formation as a function of time by for example infrared spectroscopy; (d) monitoring shrinkage or change in volume during cure; or (e) monitoring changes in dielectric properties as a function of cure time. Curing can be accomplished over a wide range of times depending on specific composition, application and application geometry, curing temperature. For anaerobic compositions the cure speed typically varies from minutes (very fast) to days (very slow).

Curing of a polymerizable composition can be obtained by subjecting the composition to curing conditions, such as but not limited to heating, etc., leading to the reaction of reactive groups of the composition and resulting in polymerization and formation of a solid polymerizate. When a polymerizable composition is subjected to curing conditions, following polymerization and after reaction of most of the reactive groups occurs, the rate of reaction of the remaining unreacted reactive groups becomes progressively slower. In some non-limiting embodiments, the polymerizable composition can be subjected to curing conditions until it is at least partially cured. The term "at least partially cured" means subjecting the polymerizable composition to curing conditions, wherein reaction of at least a portion of the reactive groups of the composition occurs, to form a solid polymerizate. In some non-limiting embodiments, the polymerizable composition can be subjected to curing conditions such that a substantially complete cure is attained and wherein further exposure to curing conditions results in no significant further improvement in polymer properties, such as strength or hardness.

This present invention concerns anaerobic compositions, which can be useful in polymerizable (curable) adhesives and sealants. Anaerobic compositions are commonly composed of curable unsaturated monomers, specifically methacrylate ester monomers, in combination with peroxy polymerization initiators. While the peroxy initiator in the anaerobic composition is capable of polymerizing the monomer within a short time in the substantial absence of oxygen, such polymerization will not take place as long as the composition remains in adequate contact with oxygen.

The present inventors have discovered novel anaerobic formulations capable of curing on surfaces with low activity toward anaerobic cure. The invention concerns anaerobic compositions comprising at least one polymerizable acrylate ester monomer; at least one activator containing a ferrocene moiety; at least one peroxy polymerization initiator for such monomer; and saccharin or derivatives thereof.

Also included within the scope of this invention is a process for bonding substrates which involves applying to at least a portion of one of said substrates the above-described activator and/or acid surface primer (described above as the "second part"), applying to the same or a different substrate the monomer/peroxy initiator mixture (described above as the "first part"), and maintaining the substrates so treated in abutting relationship with the first part and second part in mutual contact until the anaerobic composition has cured to seal and/or bond said substrates together.

The inventors discovered, unexpectedly, that saccharin has the advantage of inducing less corrosion on substrates as compared to strong acids. As described herein, a strong acid is defined as one having a pKA less than about −2, moderately strong acids are defined as having a pKa in the range of about −2 to about 2, and weak acids are defined as having a pKa of greater than about 2. Typical strong acids include, for example, sulfuric acid and hydrogen chloride. In addition, saccharin may function either as a primer or as a component in a second, mixable part. The invention comprises the composition as whole, as well as a two-part anaerobic composition wherein the acrylate ester monomer and peroxy initiator comprise the first part and the ferrocene activator and saccharin comprise the second part. The second portion of the composition may be used as a surface primer prior to application of the first component. In an additional embodiment of the invention, the first and second components may be mixed immediately before application.

The presently described compositions and methods produce a rapid speed of cure as compared to conventional methods. Previously, the use of saccharin as an accelerator resulted in slow cure times, on the order of days or more. The current inventors have found, unexpectedly, that the combination of saccharin with a ferrocene activator results in more rapid cure than prior art systems without affecting the strength or flexibility of the bond which is formed.

Anaerobic curable compositions generally are based on a (meth)acrylate component, together with an anaerobic cure-inducing composition. However, the present invention is not limited to (meth)acrylate systems. Other poly acrylate polymers may be utilized, as described in detail below.

As described above, the composition requires a polymerizable monomer and a peroxy initiator capable of polymerizing with the monomer at room temperature. (Meth)acrylate monomers suitable for use as the (meth)acrylate component in the present invention may be selected from a wide variety of materials, such as those represented by $H_2C=CGCO_2R^8$, where G may be hydrogen, halogen or alkyl groups having from 1 to about 4 carbon atoms, and $R^8$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, for example di- or tri-functional (meth)acrylates such as polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylates ("TMPTMA"), diethylene glycol dimethacrylate, triethylene glycol dimethacrylates ("TRIEGMA"), tetraethylene glycol di(meth)acrylates, dipropylene glycol di(meth)acrylates, di-(pentamethylene glycol) di(meth)acrylates, tetraethylene diglycol di(meth)acrylates, diglycerol tetra(meth)acrylates, tetramethylene di(meth)acrylates, ethylene di(meth)acrylates, neopentyl glycol di(meth)acrylates, and bisphenol-A mono and di(meth)acrylates, such as ethoxylated bisphenol-A (meth)acrylate ("EBIPMA"), and bisphenol-F mono and di(meth)acrylates, such as ethoxylated bisphenol-A (meth)acrylate.

Still other (meth)acrylate monomers that may be used herein include silicone (meth)acrylate moieties ("SiMA"), such as those taught by and claimed in U.S. Pat. No. 5,605,999 (Chu), incorporated herein by reference.

Other suitable monomers include polyacrylate esters represented by the formula

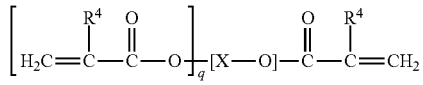

wherein $R^4$ is a radical selected from the group consisting of hydrogen, halogen and alkyl of from 1 to about 4 carbon atoms; q is an integer equal to at least 1, and preferably equal to from 1 to about 4; and X is an organic radical containing at least two carbon atoms and having a total bonding capacity of q plus 1. With regard to the upper limit for the number of carbon atoms in X, workable monomers exist at essentially any value. As a practical matter, however, a general upper limit is about 50 carbon atoms, preferably 30, and most preferably about 20.

For example, X can be an organic radical of the formula:

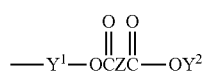

wherein each of $Y^1$ and $Y^2$ is an organic radical, preferably a hydrocarbon group, containing at least 2 carbon atoms, and preferably from 2 to about 10 carbon atoms, and Z is an organic radical, preferably a hydrocarbon group, containing at least 1 carbon atom, and preferably from 2 to about 10 carbon atoms.

Other classes of useful monomers are the reaction products of di- or tri-alkylolamines (e.g., ethanolamines or propanolamines) with acrylic acids, such as are disclosed in French Pat. No. 1,581,361.

Non-limiting examples of useful acrylic ester oligomers include those having the following general formula:

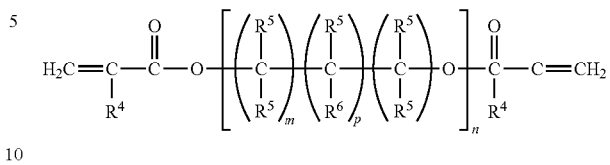

wherein $R^5$ represents a radical selected from the group consisting of hydrogen, lower alkyl of from 1 to about 4 carbon atoms, hydroxy alkyl of from 1 to about 4 carbon atoms, and

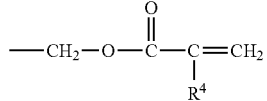

wherein $R^4$ is a radical selected from the group consisting of hydrogen, halogen, and lower alkyl of from 1 to about 4 carbon atoms; $R^6$ is a radical selected from the group consisting of hydrogen, hydroxyl, and

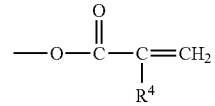

m is an integer equal to at least 1, e.g., from 1 to about 15 or higher, and preferably from 1 to about 8; n is an integer equal to at least 1, e.g., 1 to about 40 or more, and preferably between about 2 and about 10; and p is 0 or 1.

Typical examples of acrylic ester oligomers corresponding to the above general formula include di-, tri- and tetraethyleneglycol dimethacrylate; di(pentamethyleneglycol) dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters, and particularly the polyacrylate esters described in the preceding paragraphs, can be desirable, monofunctional acrylate esters (esters containing one acrylate group) also may be used. When dealing with monofunctional acrylate esters, it is highly preferable to use an ester which has a relatively polar alcoholic moiety. Such materials are less volatile than low molecular weight alkyl esters and, more important, the polar group tends to provide intermolecular attraction during and after cure, thus producing more desirable cure properties, as well as a more durable sealant or adhesive. Most preferably, the polar group is selected from labile hydrogen, heterocyclic ring, hydroxy, amino, cyano, and halo polar groups. Typical examples of compounds within this category are cyclohexyl methacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Another useful class of monomers is prepared by the reaction of a monofunctionally substituted alkyl or aryl acrylate ester containing an active hydrogen atom on the functional substituent. This monofunctional, acrylate-terminated material is reacted with an organic polyisocyanate in suitable proportions so as to convert all of the isocyanate groups to urethane or ureido groups. The monofunctional alkyl and aryl acrylate esters are preferably the acrylates and methacrylates containing hydroxy or amino functional groups on the nonacrylate portion thereof. Acrylate esters suitable for use have the formula

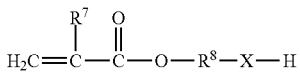

wherein X is selected from the group consisting of —O— and

and $R^9$ is selected from the group consisting of hydrogen and lower alkyl of 1 through 7 carbon atoms; $R^7$ is selected from the class consisting of hydrogen, chlorine and methyl and ethyl radicals; and $R^8$ is a divalent organic radical selected from lower alkylene of 1 through 8 carbon atoms, phenylene or naphthylene. These groups upon proper reaction with a polyisocyanate, yield:

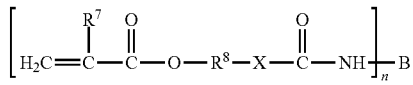

wherein n is an integer from 2 to about 6; B is a polyvalent organic radical selected from alkyl, alkenyl, cycloalkyl, cycloalkenyl, aryl, aralkyl, alkaryl or heterocyclic radicals both substituted and unsubstituted; and $R^7$, $R^8$ and X have the meanings given above.

The hydroxy- and amine-containing materials suitable for use in the preparation of the above monomeric products are exemplified by, but not limited to, such materials as hydroxyethyl acrylate, hydroxyethyl methacrylate, aminoethyl methacrylate, 3-hydroxypropyl methacrylate, aminopropyl methacrylate, hydroxyhexyl acrylate, t-butylaminoethyl methacrylate, hydroxyoctyl methacrylate, and the like.

The preferred organic polyisocyanates comprise the higher alkenyl diisocyanates, the cycloalkenyl diisocyanates and the aromatic diisocyanates containing 8 or more carbon atoms and preferably from 8 to about 30 carbon atoms, such as, for example, octamethylene diisocyanate, durene diisocyanate, 4,4'-diphenyldiisocyanate, and toluene diisocyanate.

Of course, combinations of these (meth)acrylate monomers and other classes of monomers may also be used.

The monomer component can comprise from about 10 to about 90 percent by weight of the composition, such as about 60 to about 90 percent by weight, based on the total weight of the composition.

The inventive compositions may also include other conventional components, such as initiators, accelerators, and inhibitors of free radical generation, as well as metal catalysts.

Also, the composition comprises at lease one polymerization initiator capable of polymerizing the monomer in the absence of oxygen. In some embodiments, the anaerobic composition is prepared by mixing a peroxy initiator with the polymerizable monomer. In some embodiments, the peroxy initiator comprises hydroperoxides. Such hydroperoxides include, without limitation, cumene hydroperoxide ("CHP"), para-menthane hydroperoxide, t-butyl hydroperoxide ("TBH") and t-butyl perbenzoate. In another embodiment, the peroxy initiator comprises a peroxyester. Peroxyesters are compounds containing the functional group —C(O)—O—O—. Examples of peroxyesters include tert-butylperbenzoate; di-tert-butyl diperoxyazelate; 2,5-di(benzoylperoxy)2,5-dimethylhexane and tert-amyl peroctoate.

Other well-known initiators of free radical polymerization which may be incorporated into the inventive compositions include, without limitation, other peroxides including benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

The polymerization initiators can be used in a wide range of concentrations. For example, about 0.1-10% by weight. In a preferred embodiment, the peroxy initiator is present in a concentration of 0.5-5.0% by weight.

Such peroxide compounds can be employed in the present invention in the range of from about 0.1 to about 10 percent by weight, based on the total weight of the composition, with about 1 to about 5 percent by weight being desirable.

The compositions of the invention also require an effective amount of an activator containing a ferrocene moiety. Ferrocene is a crystalline solid having the chemical formula $(C_5H_5)_2Fe$. Ferrocene and its derivatives are stable organometallic compounds which perform unique functions in the anaerobic composition. The ferrocene moiety speeds the cure of the inventive anaerobic composition. Non-limiting examples of the activator include ferrocene, polymers incorporating ferrocene, the acyl, aryl, alkyl, hydroxyalkyl and alkenyl derivatives of ferrocene, and mixtures thereof "Polymers incorporating ferrocene" refers to both polymers incorporating ferrocene in their backbone structure and polymers in which the ferrocenyl groups are separate from the backbone structure, such as incorporated on a side chain. A wide variety of its derivatives are suitable for use in the instant invention. The derivatives include phenyl, and alkyl, hydroxyl, and carboxyl substituted phenyl compounds, acetyl, benzoyl, benzenesulfonyl, carbonyl, acid-ester and aldehyde compounds. Polymers may incorporate ferrocene units as pendant groups from the backbone chain or may be polymers of ferrocene itself or of its derivatives, e.g., an alkyl adduct containing about 1 to 6 carbon atoms. One example of such a derivative is butylferrocene. A combination of a number of ferrocene derivatives may be used in the present invention. The ferrocene may be present at a concentration of about 0.01-10% by weight, or about 0.25-2.5% by weight.

The effect of the activator on cure speed of the anaerobic composition depends upon the identity of the activator compound chosen.

In addition, the composition can further comprise one or more conventional accelerators of free radical polymerization. These compounds accelerate the cure once it has been started by the polymerization initiator. Useful accelerators are those that do not destroy the shelf stability of the product but which accelerate the rate of cure once it has been initiated during use conditions. It should be noted that large numbers of polymerization accelerators are known in the art. Such accelerators may be of the hydrazine variety (e.g., APH), as disclosed in U.S. Pat. Nos. 4,287,350 (Rich) and 4,321,349 (Rich). Maleic acid is usually added to APH-containing anaerobic cure systems. Other accelerators may include N,N-dimethyl-para-toluidine; 1,2,3,4-tetrahydroquinoline; N,N- diethyl-ortho-toluidine; rhodamine; tributyl amine; N-methyldiethanolamine; and N,N,N,N,N-pentamethyldiethylenetriamine. The accelerators may be used in amounts of about 0.1 to about 5 percent by weight, such as about 1 to about 2 percent by weight, based on the total weight of the composition.

Stabilizers and inhibitors (such as phenols including hydroquinone and quinones) may also be employed to control and prevent premature peroxide decomposition and polymerization of the composition of the present invention, as well as chelating agents [such as the tetrasodium salt of ethylenediamine tetraacetic acid ("EDTA")] to trap trace amounts of metal contaminants therefrom. When used, chelating agents may ordinarily be present in the compositions in an amount from about 0.001 percent by weight to about 0.1 percent by weight, based on the total weight of the composition. Also contemplated by the present invention are polymerization inhibitors. These compounds prevent polymerization of the acrylate ester monomer prior to the time of use.

As previously mentioned, the above-described ingredients are used in combination with saccharin. Saccharin acts to stabilize the polymer solution. In addition, saccharin derivatives may be used in the present methods. As used herein, the term "saccharin derivative" includes known metal salts of saccharin, e.g. sodium, potassium, copper, iron, etc. that result from the reaction of saccharin with metals or metathesis with metal salts. Other sulfimides with related structures, such as succinimide, may also be used in the current methods.

It has been discovered that the addition of saccharin in amounts of from 0.01 wt. % to 10 wt. %, preferably from 0.1 wt. % to 2.5 wt. %, rapidly catalyzes anaerobic cure. The use of saccharin has the advantage of inducing less corrosion when compared to strong acids.

When the saccharin is added to the mixture of polymerizable acrylate ester monomer and peroxy polymerization initiator (in a two-part system in the absence of the activator, which then would be used as a second component), the amount of the saccharin should be between about 0.01 and about 10 percent by weight of the anaerobic composition. A useful range is between about 0.1 and about 2.5 percent and most preferably between about 0.25 and about 1.0 percent weight of the anaerobic composition.

One of skill in the art would recognize that other compounds may be added to the present inventive composition. These compounds may include thickeners, dyes and adhesive agents or combinations thereof. For instance, one or more of maleimide components, thermal resistance-conferring coreactants, diluent components reactive at elevated temperature conditions, mono- or poly-hydroxyalkanes, polymeric plasticizers, and chelators (see U.S. Pat. No. 6,391,993, incorporated herein by reference) may be included to modify the physical property and/or cure profile of the formulation and/or the strength or temperature resistance of the cured adhesive.

The anaerobic compositions described above can be used in a variety of processes to seal or bond substrates. For example, the above-described ingredients can be mixed and the total composition applied as a whole to the substrates. When this type of process is used, it is useful to mix all the ingredients in advance except for the saccharin or the activator. In view of the rapid curing characteristics of the fully mixed system, the last ingredient is added immediately prior to the sealing or bonding operation.

The inventive compositions may be extruded, screen printed or otherwise coated onto components, such as flange parts, during assembly to form continuous beads or films, which provide seals between opposing flange parts after curing. In the case of a two-component product, a static mixing head, co-extrusion line or sequential layer-on-layer deposition may be employed. Alternatively, each component may be applied separately to opposing parts, and cured after assembly has taken place.

In one embodiment, the bonding operation is used to utilize the surface activation approach, in which either the saccharin or the activator combination is applied to either or both of the substrates as a first step. The balance of the composition (the monomer/initiator mixture, plus any additives which may be used) is applied to either or both of the substrates as a second operation. It has been found that in this way the bonding operation is completed much more quickly following contact of the various active ingredients, and thus excessive cure will most likely not take place prior to completion of the bonding operation.

When used in a two-part system, the concentration of each component can vary within wide ranges. In one embodiment, the second part is applied as a surface primer. In this embodiment, the ingredients preferably are dissolved in a volatile solvent or dispersed in a carrier. A suitable use level of activator in the solvent or carrier is between about 0.1 and about 50 percent, and preferably about 1 and about 20 percent, by weight of the solution or dispersion. The solvent or carrier is one which will readily evaporate, e.g., one which will evaporate from a thin film in less than about 15 minutes at room temperature. Examples of solvents which generally can be used are benzene and toluene; chlorinated and/or fluorinated hydrocarbons such as trichloromonofluoroethane, methylene chloride, methylchloroform, trichloroethylene, and trichloroethane; lacquer-type solvents, such as acetone, ethylacetate and methylethylketone; alcohols, such as ethanol, propanol and isopropanol; and water. In addition, more than one solvent may be used in a blend or mixture. The solvent solution may be applied directly to the substrate to be bonded and the solvents will evaporate. This will leave a coating of the surface activator upon the substrates.

Unlike many known surface primers, the use of saccharin and ferrocene moieties as in the present invention does not appreciably corrode the substrate and hence can be applied to substrates well in advance of application of the balance of the adhesive or sealant composition. This can be extremely beneficial in production line applications.

Following application of the composition to the substrates by whichever method is used, the substrates then are maintained in the predetermined relationship in which they are to be sealed or bonded until sufficient cure has taken place. It has generally been found that cure will proceed sufficiently within a matter of minutes such that outside fixturing of the substrates is not necessary.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, and other metals and alloys, ceramics and thermosets. The compositions of this invention demonstrate particularly good bond strength on steel, brass, copper and zinc. An appropriate primer for anaerobic curable compositions may be applied to a surface of the chosen substrate to enhance cure rate. A primer is a chemical compound which is applied to a surface prior to application of the anaerobic composition and which dramatically increase the speed of cure. These primers are not added directly to the anaerobic composition due to their extreme activity and tendency to destroy the shelf stability of the product. Typical examples of such surface primers are disclosed in, for example, U.S. Pat. No. 3,591,438 of Toback and O'Connor, issued Jul. 6, 1971. Various organometallic compounds are commonly used as such surface primers. Or, the inventive anaerobic cure accelerators may be applied to the surface of a substrate as a primer. See e.g. U.S. Pat. No. 5,811,473 (Ramos).

EXAMPLES

Example I

Primer Cure One Part System

The following example illustrates a single part formulation of the inventive composition.

TABLE 1

Reagents and Materials

| Components | Amount (g) |
|---|---|
| Urethane acrylate resin | 37.00 |
| 2-Hydropropyl methacrylate | 11.08 |
| Ferrocene | 0.50 |
| 5% Naphthoquinone in polyethylene glycol methacrylate (PEGMA) | 0.25 |
| 3.5% Dequest 2010* in methanol/water | 0.12 |
| 2% Tributylamine in PEGMA | 0.25 |
| Cumene hydroperoxide (CHP) | 0.80 |
| TOTAL | 50.00 |

*ClearTech Industries, Vancouver, B.C. A commercial metal sequestrant having 1-hydroxyethylidene-1,1-diphosphonic acid as main active component The urethane acrylate resin is a blend of methacrylate terminated urethane-diol oligomer and isobornyl methacrylate. The oligomer is prepared by reaction of toluene diisocyanate, hydrogenated bisphenol A, poly(tetramethylene oxide) diol, 2000 molecular weight and hydroxypropyl methacrylate in the presence of a tin catalyst.

The reagents and materials listed in Table 1, with the exception of CHP, were mixed using a high shear blade for one hour. After allowing the solution to cool to room temperature, CHP was added and the mixture stirred for 15 min. A 5% solution of saccharin in acetone was applied to four stainless steel laps. The laps were allowed to dry. A thin film of the CHP containing solution was applied to two laps. The loaded laps were then mated with a non-loaded lap and clamped. The results are illustrated in Table 2.

TABLE 2

| Time After Clamp | Observed Results |
|---|---|
| 1.5 min. | Fixture observed.* |
| 1 hour | Laps difficult to break; fully cured appearance.** |
| 2 hours | Laps difficult to break; fully cured appearance.*** |

*Generally indicates steel panels can support load corresponding to their own weight. They do not fall apart when clamps are removed.
**Generally indicates hand force applied to break bonds. Typically <1 MPa (~145 psi)
***Cannot be broken in hand shear test. Indicates tensile shear >1 MPa The results illustrated in Table 2 indicate that the saccharin rapidly catalyzed anaerobic cure when used in a one-part system in place of a strong acid.

Example II

Two-Part System A

The following example illustrates a two-part formulation of the inventive composition.

TABLE 3

| Component | Part A Amount (g) | Part B Amount (g) |
|---|---|---|
| Urethane acrylate resin | 37.13 | 37.33 |
| 2-Hydropropyl methacrylate | 10.87 | 10.92 |
| Ferrocene | 0.00 | 1.00 |
| 5% Naphthoquinone in PEGMA | 0.25 | 0.25 |
| 3.5% Dequest 2010* in methanol/water | 0.25 | 0.00 |
| 2% Tributylamine in PEGMA | 0.00 | 0.50 |
| Saccharin | 0.50 | 0.00 |
| Cumene hydroperoxide (CHP) | 1.00 | 0.00 |
| TOTAL | 50.00 | 50.00 |

*ClearTech Industries, Vancouver, B.C.

The "A" formulation was prepared as follows:

All components with the exception of CHP were mixed using a high shear blade for 45 minutes. After allowing the solution to cool to room temperature, CHP was added and the mixture stirred for 15 minutes.

The "B" formulation was prepared as follows:

All components were mixed using a high shear blade for 45 minutes.

Equal amounts of formulation A and formulation B were mixed by hand for 2 minutes. A thin film (approximately 0.25 mm) of formulation A and B mixture were applied to two laps. The films were applied to the ends of each lap shear specimen having dimensions of 101.6×25.4×1.6 cu mm. The loaded laps were then mated with a non-loaded lap and clamped. On assembly and clamping the adhesive material is squeezed to the fillet of the joint and the excess removed. The overlap area is usually 25.4×12.7 sq mm. This procedure provides a uniform film of adhesive between the assembled specimens in the region of 50-100 mm. The precise thickness will depend on the viscosity of the adhesive and the clamping force employed.

The fixturing time is determined as the minimum time required for the lap shear specimens to sustain a load corresponding to the mass of one of the specimen panels (about 30 g) under force of gravity. Fixture was observed 3 minutes after assembly. The clamped specimens were stored at room temperature for 24 hours. After 24 hours, the adhesive strength was determined by the degree of difficulty required to break the bonds by hand. It was observed at this time that the laps were difficult to break and displayed a fully cured appearance.

The results illustrate that the saccharin rapidly catalyzed anaerobic cure when used in a two-part system utilizing cumene hydroperoxide as an initiator.

Example III

Two-Part System B

The following example illustrates a two-component formulation of the inventive composition.

TABLE 4

| Component | Part A Amount (g) | Part B Amount (g) |
|---|---|---|
| Urethane acrylate resin** | 37.13 | 37.33 |
| 2-Phenoxyethyl methacrylate | 10.87 | 10.92 |
| Ferrocene | 0.00 | 1.00 |
| 5% Naphthoquinone in PEGMA | 0.25 | 0.25 |

TABLE 4-continued

| Component | Part A Amount (g) | Part B Amount (g) |
|---|---|---|
| 3.5% Dequest 2010* in methanol/water | 0.25 | 0.00 |
| 2% Tributylamine in PEGMA | 0.00 | 0.50 |
| Saccharin | 0.50 | 0.00 |
| t-Butyl hydroperoxide (t-BP) | 1.00 | 0.00 |
| TOTAL | 50.00 | 50.00 |

*ClearTech Industries, Vancouver, B.C.
**3000 MW Poly(diethylene glycol adipate) capped with hydrogenated NDI and 2-hydroxyethyl methacrylate.

The "A" formulation was prepared as follows:

All components with the exception of t-BP were mixed using a high shear blade for 45 minutes. After allowing the solution to cool to room temperature, t-BP was added and the mixture stirred for 15 minutes.

The "B" formulation was prepared as follows:

All components were mixed using a high shear blade for 45 minutes.

Equal amounts of formulation A and formulation B were mixed by hand for 2 minutes. A thin film of formulation A and B mixture was applied to two laps. The loaded laps were then mated with a non-loaded lap and clamped. Fixture was observed 3 minutes after assembly. The clamped specimens were stored at room temperature for 24 hours. It was observed at this time that the laps were difficult to break and displayed a fully cured appearance.

The results illustrate that the saccharin rapidly catalyzed anaerobic cure when used in a two-part system utilizing t-butyl hydroperoxide as an initiator.

Example 4

Two-Part Non-Methacrylate System

The following example illustrates a two-component non-methacrylate formulation of the inventive composition displaying excellent oil resistance.

TABLE 5

| Component | Part A Amount (g) | Part B Amount (g) |
|---|---|---|
| Kaneka RC220C** | 38.40 | 38.60 |
| 2-Phenoxyethyl methacrylate | 9.60 | 9.65 |
| Ferrocene | 0.00 | 1.00 |
| 5% Naphthoquinone in PEGMA | 0.25 | 0.25 |
| 3.5% Dequest 2010* in methanol/water | 0.25 | 0.00 |
| 2% Tributylamine in PEGMA | 0.00 | 0.50 |
| Saccharin | 0.50 | 0.00 |
| t-Butyl hydroperoxide (t-BP) | 1.00 | 0.00 |
| TOTAL | 50.00 | 50.00 |

*ClearTech Industries, Vancouver, B.C.
**Kaneka Corporation, Osaka, Japan. An acrylate terminated liquid polyacrylate with a MW of about 22,000 and viscosity about 600 Pas at 23° C.

The "A" formulation was prepared as follows:

All components with the exception of t-BP were mixed using a high shear blade for 45 minutes. After allowing the solution to cool to room temperature, t-BP was added and the mixture stirred for 15 minutes.

The "B" formulation was prepared as follows:

All components were mixed using a high shear blade for 45 minutes.

Equal amounts of formulation A and formulation B were mixed by hand and gellation time observed. Full curing was observed after 30 minutes.

This example illustrates the feasibility of a non-methacrylate system that exhibits reduced, but still reasonable cure times. This example also illustrates the production of a composition possessing excellent oil resistance which has utility in gasket formations.

What is claimed is:

1. A method for sealing or bonding at least two substrates comprising:
    a. applying to at least one of said substrates a primer composition comprising an activator comprising a ferrocene moiety;
    b. applying to at least one of said substrates a polymerizable composition comprising at least one polymerizable acrylate ester monomer, at least one peroxy polymerization initiator capable of polymerizing said monomer in the substantial absence of oxygen and saccharin, a saccharin derivative or a related sulfimide derivative; and
    c. placing said substrates in an abutting relationship until the polymerizable composition has at least partially cured.

2. The method of claim 1 wherein the initiator is a hydroperoxide.

3. The method of claim 1 wherein the initiator is a peroxyester.

4. The method of claim 1 wherein the polymerizable acrylate ester monomer has a molecular weight of about 100 to about 30,000.

5. The method of claim 1 wherein the activator is selected from the group consisting of ferrocene, polymers incorporating ferrocene, derivatives of ferrocene, and mixtures thereof.

6. The method of claim 5 wherein the activator is ferrocene.

7. The method of claim 5 wherein the activator is a ferrocene polymer.

8. The method of claim 5 wherein the activator is present in the amount of about 0.1 to about 50 percent by weight, based upon the total weight of the composition.

* * * * *